(12) United States Patent
Williams

(10) Patent No.: US 7,590,724 B1
(45) Date of Patent: Sep. 15, 2009

(54) AUTO INSTRUMENTATION SYSTEM

(76) Inventor: Robert D. Williams, 959 Poppy St., Los Angeles, CA (US) 90042-1355

( * ) Notice: Subject to any disclaimer, the term of this patent is extended or adjusted under 35 U.S.C. 154(b) by 1135 days.

(21) Appl. No.: 10/421,280

(22) Filed: Apr. 23, 2003

Related U.S. Application Data

(60) Provisional application No. 60/376,385, filed on Apr. 29, 2002.

(51) Int. Cl.
*G06F 15/173* (2006.01)

(52) U.S. Cl. .................. 709/224; 709/203; 709/217; 719/316

(58) Field of Classification Search ............... 709/203, 709/217, 224; 719/316
See application file for complete search history.

(56) References Cited

U.S. PATENT DOCUMENTS

| | | | |
|---|---|---|---|
| 5,819,028 A * | 10/1998 | Manghirmalani et al. ..... 714/57 |
| 6,317,787 B1 * | 11/2001 | Boyd et al. ................. 709/224 |
| 6,470,383 B1 * | 10/2002 | Leshem et al. ............. 709/223 |
| 6,721,747 B2 * | 4/2004 | Lipkin ......................... 707/10 |
| 6,801,940 B1 * | 10/2004 | Moran et al. ............... 709/224 |
| 6,983,321 B2 * | 1/2006 | Trinon et al. ............... 709/224 |
| 7,200,662 B2 * | 4/2007 | Hasan et al. ................ 709/226 |
| 2002/0016839 A1 * | 2/2002 | Smith et al. ................. 709/224 |
| 2003/0005108 A1 * | 1/2003 | Bartley et al. .............. 709/224 |
| 2003/0069922 A1 * | 4/2003 | Arunachalam .............. 709/203 |
| 2004/0078423 A1 * | 4/2004 | Satyavolu et al. .......... 709/203 |
| 2005/0102394 A1 * | 5/2005 | Loveland .................... 709/224 |

\* cited by examiner

*Primary Examiner*—Michael Won

(57) ABSTRACT

A method of business activity monitoring is provided. A management object is created and attached to an operational component without modifying software for the operational component. Then data associated with the operational component is monitored. The process of instrumenting business activity monitoring can be referred to as auto instrumentation.

26 Claims, 14 Drawing Sheets

AUTO INSTRUMENTATION SYSTEM

CROSS-REFERENCE TO RELATED APPLICATION(S)

This application claims the benefit of U.S. Provisional Patent Application No. 60/376,385, entitled "Business Process Management System," filed Apr. 29, 2002, the contents of which are fully incorporated by reference herein.

BACKGROUND

Management often desires to have access to aggregated information such as the average time it takes to process an order, availability, a transaction count, sales volume of a specific product, and the like. Such aggregated information should be provided real-time for the management to take actions real-time if needed. However, in current systems, such aggregated information is typically provided as stored in a data warehouse or an SQL database. As the data warehouses are typically updated only few times a day, the data generally cannot be provided real-time.

Further, when the data is provided real-time, the management may not necessarily wish to continuously view changes to the aggregated data, but may instead wish to view only when a predetermined condition is satisfied by the aggregated data.

In addition, a representation of the data as a whole typically does not exist in the database. Instead, the database is formless, and data needed for such aggregation is typically spread through multiple different tasks, and on multiple different tables. This necessitates querying individual tasks and/or tables in the databases. Therefore, multiple queries typically have to be made to the tasks or tables (such as in the SQL data source) in order to obtain necessary data required for aggregation.

In order to access data real-time, the code typically must be modified. Any such modification of codes or ad hoc creation of new codes typically requires many code hours. Further, any such modification to the code may result in errors. For example, since the codes typically exist as a cluster of multiple instances, making changes to an instance may affect other instances. In addition, coding to meet orthogonal requirements of the management and/or operation may result in the requirement for one adversely affecting the other. Further, many data requirements are ad hoc, and therefore, modification of codes to meet data requirements may require multiple different modification of codes.

SUMMARY

In an exemplary embodiment in accordance with aspects of the present invention, a method of business activity monitoring is provided. The business activity monitoring comprises: creating a management object; attaching the management object to an operational component without modifying software for the operational component; and monitoring data associated with the operational component.

In another exemplary embodiment in accordance with aspects of the present invention, a system for business activity monitoring instrumentation is provided. The system comprises: a client comprising a control/display panel capable of providing an interface with a user, wherein the user can instrument business activity monitoring without modifying a code of an operational component to be monitored, wherein the user can generate objects, and wherein at least one of said objects can be used to instrument the business activity monitoring; a broker server capable of accessing data associated with the operational component to be monitored; and a registry server capable of monitoring the data accessed by the broker server and providing information regarding the data to the client.

These and other aspects of the invention will be more readily comprehended in view of the discussion herein and accompanying drawings.

BRIEF DESCRIPTION OF THE DRAWINGS

FIG. 14 is a screen shot that illustrates creation of dimensions to which the attributes will be mapped to;

DETAILED DESCRIPTION

Figure 1:
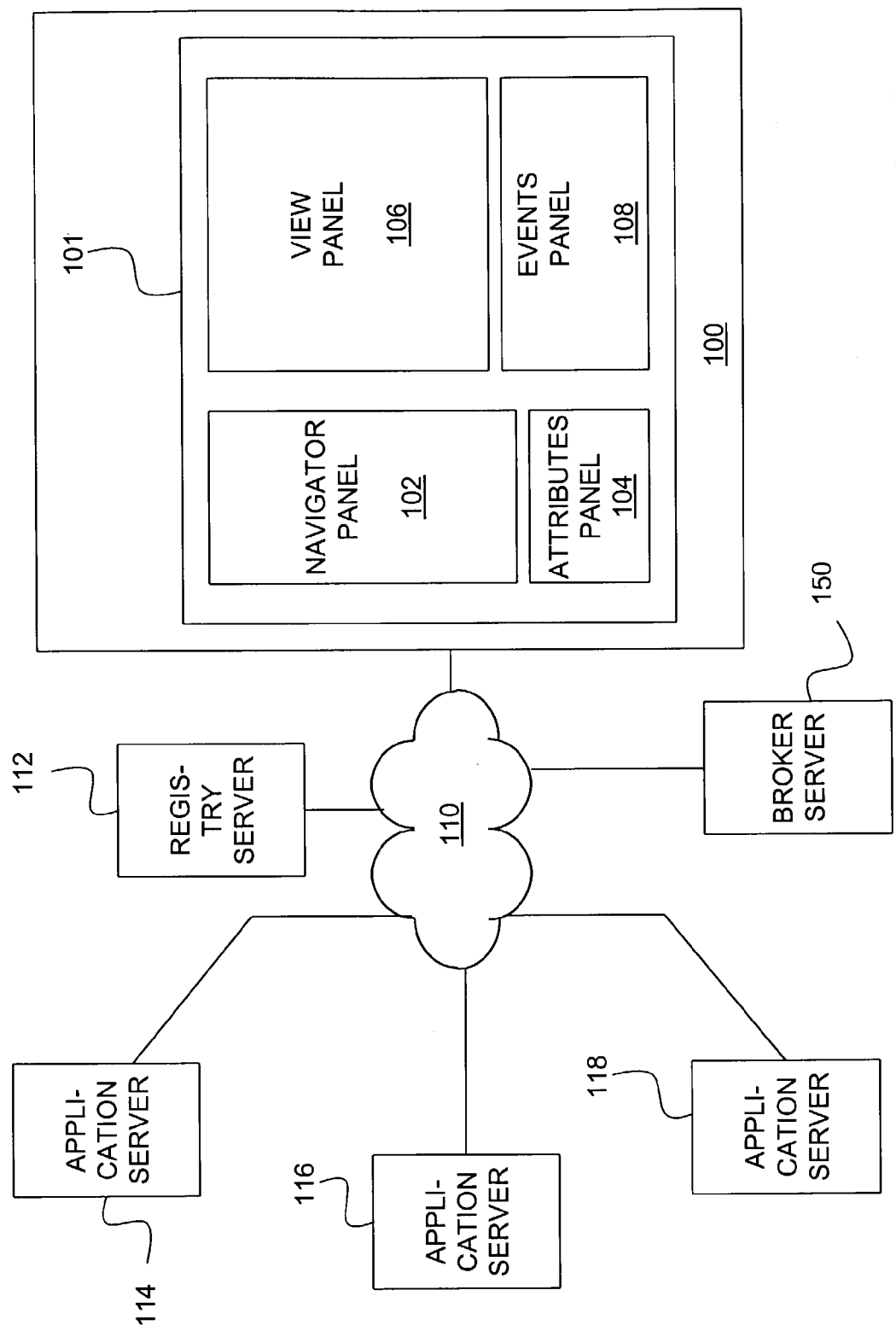
FIG. 1 is an auto instrumentation system in an exemplary embodiment in accordance with aspects of the present invention.

In systems such as business process management systems, real-time process management systems, management applications and/or other systems in an integration environment, it is desirable to provide visibility into business activities to the management using a process that can be referred to as business activity monitoring ("BAM"). However, one cannot simply add additional software components (e.g., management components) to the system and expect to be able to perform BAM. Instead, an interface should be provided to expose underlying business activities to the management components.

Such interface is typically provided through instrumentation. In typical network/server systems, instrumentation for monitoring is performed on the IT (information technology) side or the code side. However, any instrumentation on the IT/code side may be too complicated to perform for the management who may not be technically capable. In addition, even if the management is technically capable, performing such IT/code instrumentation may not be the best use of management resources. Further, while the management may be interested in business activity monitoring real-time, it may not necessarily want to continuously watch the real-time data. Hence, it is desirable to provide a method for the management to instrument the software components, without revising the software components and without necessitating a thorough understanding of the codes.

In an exemplary embodiment in accordance with the aspects of the present invention, an auto instrumentation system is provided. The auto instrumentation system is based on the idea of taking business components services, and mapping them into business management frame. The business components services typically work at instance level, extending operation management such as average processing time, cumulative processing time, and the like. The present invention allows for mapping into the management component in real-time of the instances without writing any codes. It is a wizard-based way of building aggregated MBeans on the business side. Here, an MBean is a basic unit of management, which is used to create mappable management objects (or management components), thereby enabling real-time processing and analysis of aggregated data and on-going business processes.

For example, a healthcare company may have a patient object. There are two different models for two different entities. In operation, a metric may be used as an aggregate that is tied to that patient object. A patient may, for example, have a medical attribute, therapy attribute, a billing attribute, a prescription attribute, an admittance attribute and the like. At the management level, an aggregate of an attribute may be obtained across multiple patients. For example, all prescription attributes can be mapped into one MBean for the management. It is also possible to make an operational instance MBean. Since many data requirements are ad hoc, the MBeans can be used to define an multi-dimensional aggregate at a run-time.

FIG. 1 for example is an auto instrumentation system in an exemplary embodiment in accordance with aspects of the present invention. The auto instrumentation system includes a client 100 having a control/display panel 101 used for user interface that is displayed on client consoles. For example, each client connected to a network 110 may include a control/display panel to interface with one or more of application servers 114, 116 and 118. The network 110 also has connected thereto a broker server 150, which may be an application server. The network of FIG. 1 is provided for illustrative purposes only. In practice, the network may include other clients, servers, and/or other network devices. The control/display panels in different embodiments and/or different clients may have different appearance.

The control/display panel 101 is divided into four panels (or windows) as follows: 1) a navigation panel 102 that displays a navigation tree of objects organized into folders and sub-folders; 2) an attributes panel 104 that displays attributes of a selected object; 3) an events panel 108 that displays various different events such as alerts, failures and reaching user-defined thresholds; and 4) a view panel 106 on which graphical representations of data and relationships between objects can be displayed on a dashboard and/or workspace.

The auto instrumentation system of the present invention may be applied to various different environments such as WEBMETHODS® integration platform (or application server) and WEBLOGIC™ integration platform. In these environments, clients may access the application servers 114, 116 and 118, for example, using the servers' URLs. A set of services can be used to connect a client to one or more applications servers. For example, registry services (on a registry server 112) may provide such connection between the clients and application servers. The registry services may include a log-in service provided to the clients.

Figure 2:
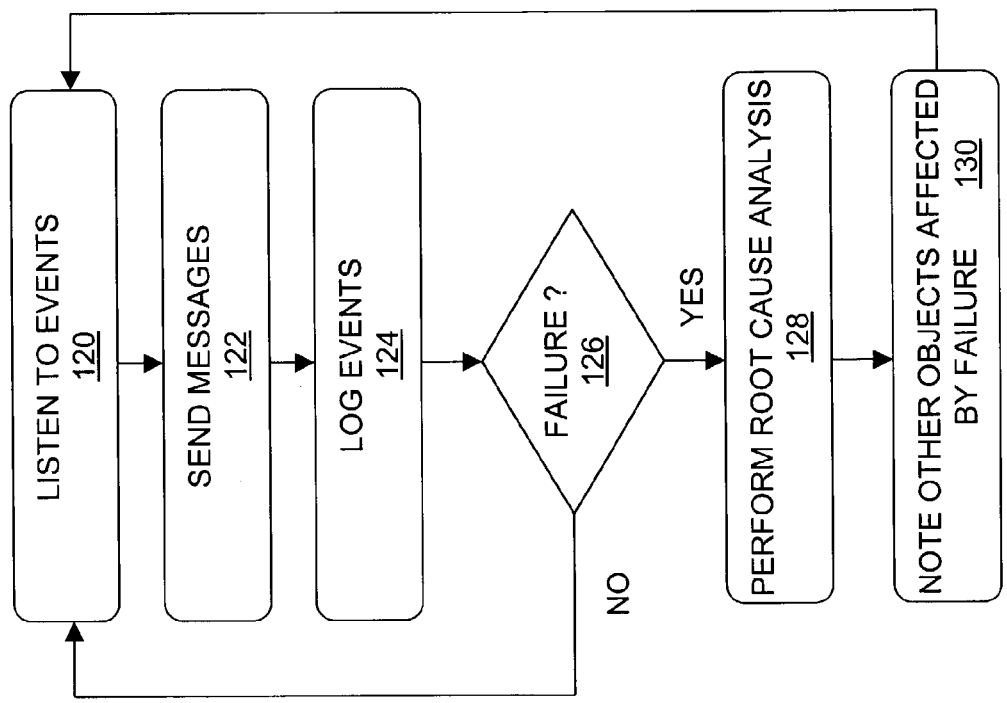
FIG. 2 is a flow diagram of events handling in an exemplary embodiment in accordance with aspects of the present invention.

FIG. 2 is a flow diagram of events handling in an exemplary embodiment in accordance with aspects of the present invention. When events occur in the integration environment, the services (e.g., registry services) listen to those events in block 120 and send corresponding messages to the client's console in block 122. These messages in turn are logged in block 124 into the control/display panel 101 and displayed on the events panel 108. The messages, for example, may be XML messages sent to the URLs of the clients. A user can elect to view: 1) current events; 2) record of every event logged in the events panel; 3) recent changes related to structural changes such as adding or removing objects; and/or 4) user-selected events to focus on particular objects.

By way of example, if a failure occurs in block 126, a root cause analysis is performed in block 128 to determine which object failed and the propagation of failure to other related objects. A relationship tree is kept in memory so that when failure occurs, other objects of the tree that are affected by the failure can be noted as shown in block 130. For instance, if a broker fails, all the failures related to or caused by that failure can be placed in the same folder in the events panel. In addition to the failures, the events may include certain peculiarities or activities, such as a component that is being executed most frequently, time for execution, and the like.

Both the system software (e.g., server software) and the additional software components may be developed in an object oriented programming language, such as, for example, JAVA®. JAVA® is a multi-platform, platform independent, object oriented programming language. JAVABEANS® are reusable software components ("RSC") that work with JAVA, and can be visually manipulated in builder tools. JAVA may be referred to herein as Java, and JAVABEANS may be referred to herein as Java Beans, Beans or a Bean.

EJB™ (Enterprise Java Beans) is a Java-based architecture, in which programs can be deployed across various different operation systems. The EJB provides an architecture for setting up program components, written in Java, that run in the server parts of a computer network that uses the client/server model. Those skilled in the art would know how to program in Java using Java Beans using the EJB architecture.

Figure 3:
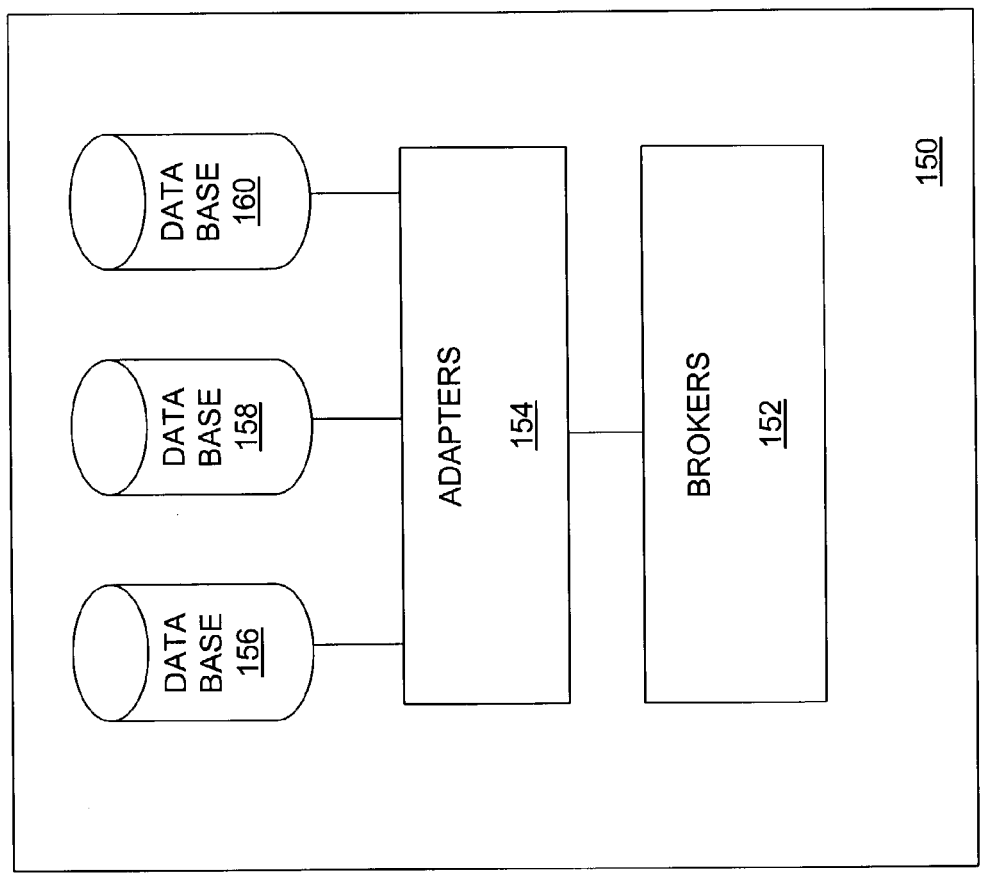
FIG. 3 is a broker server in an exemplary embodiment in accordance with aspects of the present invention.

In an exemplary embodiment in accordance with aspects of the present invention, the auto instrumentation system includes the broker server 150 illustrated in FIGS. 1 and 3. As illustrated in FIG. 3, the broker server 150 has a number of brokers 152 that are connected to adapters 154. The brokers 152 are used to perform business process steps such as extracting business process information from the databases (e.g., databases 156, 158 and/or 160), taking customer orders, and the like.

A broker may use one or more adapters 154 (e.g., ORACLE® adapter or SAP adapter) to access various different databases (156, 158 and/or 160 e.g., ORACLE database) that hold business process information. In practice, the broker server 150 may contain other brokers, adapters, databases, etc. Further, the network 110 may include other broker servers and/or broker server-accessible databases. In other embodiments, the auto instrumentation system is not limited to integration environment, and the principles of the invention are generally applicable to business process management, real-time process management system and/or management applications.

Figure 4:
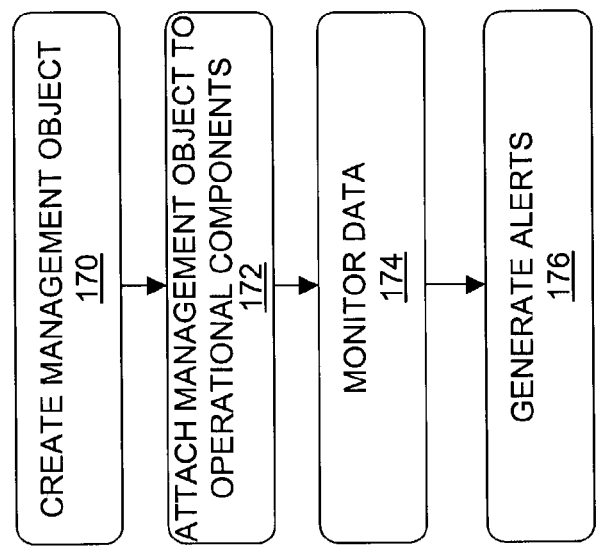
FIG. 4 is a flow diagram that illustrates creation and use of a management object for data monitoring in an exemplary embodiment in accordance with aspects of the present invention.

In essence, a logic management instrument may be provided to a software component at a relatively high level. Hence, the management can access an order Bean ("reusable software component for ordering") to see how many stock purchases have been ordered, for example. To do this, a management object (or management component) should be created using a management bean (M Bean) (170), and then it should be attached (172) to operational components as illustrated in FIG. 4. Such attachment of the management object should be performed without modifying software (e.g., source code) for the operational components.

In the exemplary auto instrumentation system, a data monitor (e.g., a data aggregator) is provided in the application server to monitor (e.g., aggregate) data (174) from various different sources. In a specific implementation, the data aggregator may, for example, be referred to as a Cached Aggregate (CAG) that the application server is pre-configured with. The data aggregator object (DAO) may not be viewed directly in the console. Hence, lookup of the data aggregator object may be mapped to a reusable software component (RSC) for DAO, where the DAO RSCs (e.g., M Beans) may be stored in a folder having the same name. One or more alert may be generated in step 176 based on defined thresholds.

Figure 5:
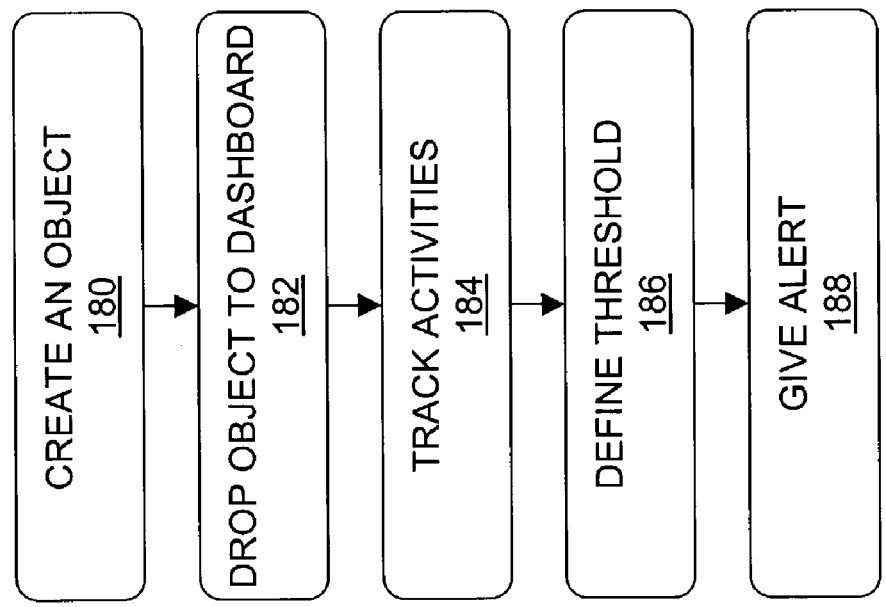
FIG. 5 is a flow diagram that illustrates wizard-based instrumentation and activity tracking in an exemplary embodiment in accordance with aspects of the present invention.

In the exemplary auto instrumentation system, a user can perform auto instrumentation using the dashboard of the view panel to add management to any type of system having components. Such auto instrumentation process is illustrated in FIG. 5. The auto instrumentation creates an object in block 180, which can be dropped to the dashboard (e.g., on the view panel 106) in block 182. Using the auto instrumentation, for example, buying and selling activities (e.g., total value of buying and selling) may be tracked real-time in block 184. In addition, thresholds for one or more attributes can be defined (186), and alerts can be given (188) (e.g., in the events panel 108) if one or more thresholds are reached for the attributes. Further, a dimensional mapping may be used to take an aggregate of the quantity being tracked. In a nutshell, the auto instrumentation allows the management to auto-generate multi-dimensional business components directly from operational components.

Figure 6:
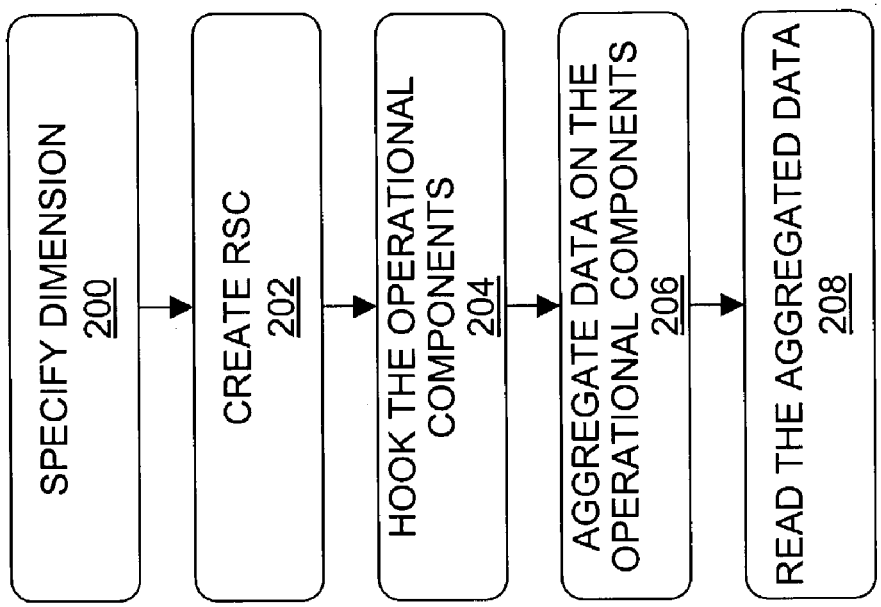
FIG. 6 is a flow diagram that illustrates hooking on operational components in an exemplary embodiment in accordance with aspects of the present invention.

In the exemplary embodiment, RSCs with unique names that can show the attributes of the DAO should be created (202). To begin the process, a dimension that will be aggregated should first be specified as illustrated in block 200 of FIG. 6. For example, to monitor all the buy and sell activities for a Company A stock, it should be noted that there is a server software, which is an EJB (Enterprise Java Bean) in a specific example, that handles the trades. Further, it should also be noted that each of the buy and sell methods have the following two parameters: 1) the stock symbol; and 2) the trade amount.

Hence, the dimension for the stock symbol should be created before shares bought and sold can be aggregated (206). For instance, it may contain stock symbols of all trades that pass through the buy and sell methods. For instance, if someone buys Company A's stock, then an entry in the table should be made for Company A's stock symbol. Further, if someone then buys Company B's stock, then an entry should be made for Company B's stock symbol.

In order to automatically generate multi-dimensional business components from operation components in the exemplary embodiment, a hooking mechanism (204), such as an EJB hooking should be used to interface with the operational components to view pertinent information. In the EJB, the Java code is created, and then inserted into a container. The container actually generates more Java code. The Java code is then converted into a byte code. The hook is inserted directly into the byte code, where the hook is independent of the byte code. Hence, no operational failure would result from hooking since the underlying byte code is not changed. In addition, the management does not have to obtain services from a web architect, integration developers or operation personnel to add the hook. The hook should be inserted into the byte code where a particular method is called, and a code should be installed to send a message to the DAO RSC when the method is called. Then the DAO RSC should access the database to read the data (208).

A composite key may be created from the dimension and mapped to hook the byte code. Any combination of queries in the dimensions can be done. During queries, a wild field "*" may also be used. Using the exemplary embodiment, day-to-day business activity may be monitored. However, as long as the system is set up the right way, it only needs attention when there is an alert (or event).

Using the composite key created from the dimensional data, the management component can have access to the data in the operational components without having access to the code (e.g., source code). This way, a "separation of concerns" is achieved through hooking into the operational component without manipulating the code. In other words, the component is hooked transparently.

In order to create a stock symbol dimension in the exemplary embodiment, a dimension creation wizard may be invoked by right clicking on one of the DAO RSC's, namely, a Trade Data RSC. When a dimensions dialog ("window") pops up, an "Add" button should be selected to create a new dimension to open an edit dimension window. First, a "Name" should be entered into the edit dimension window. The "Name" is an internal name used for the dimension. Then, a "Data Type" is entered, where this type is a text string since stock symbols are text. Also, a "Display Name" should be entered to be used for display within the application. Then an "OK" button should be clicked. Now that the stock symbol dimension has been created, it can be used to aggregate the stock trade data. This process should be repeated to create the data field to store the an aggregated balance for the stock trades.

Hence, dimensions have been created to instrument the session RSC, which may also be referred to as a Session Bean. For example, the session RSC may be stored in a stateless session folder of an EJB folder. The EJB, i.e., stateless session folder, should be right clicked to select an "Instrument RSC" from the pop up menu. This brings up a mapping dialog, where the Session RSC's method parameters are mapped to the dimensions created in the DAO. The method parameters for instrumentation are selected by checking the appropriate check boxes. Next, the Dimension is chosen to map each one to from a drop down list to the right of each check box.

A negative value can be selected for the sell method in order to keep track of a balance. In this case, buys are looked at as increasing the balance, while the sell are looked at as decreasing the balance. So the Session RSC handles trades for all the stocks. The instrumentation has been implemented to aggregate the buy and sell by stock symbol. Each time a new symbol is passed to the method, it should be added to the DAO. Also, other stock symbols may be looked up, and added to the DAO RSC by invoking the lookup wizard. The DAO RSC may be right clicked again to select an "Add Lookup". For example, a look up for Company B may be added to the aggregate by filling in the dialog. In the next dialog, the stock symbol for Company B may be entered as the lookup value.

After adding Company B's stock symbol, both the attributes for the Company A and Company B stock symbols may be viewed in the attributes window.

In another exemplary embodiment, the composite key may be used as a customer key in a DirecTV® system, and processed through a wizard. DirecTV® is a registered trademark of Directv, Inc., a California corporation, El Segundo, Calif. For example, Table 1 shows a composite key, which includes an aggregation of dimensional data. Category 1 may be age between 18 to 24, and Category 6 may be the top category for the income.

TABLE 1

| 1 | M | 6 |
|---|---|---|
| age | sex | income |
| * | M | * |

The composite key can be submitted to obtain the aggregate for the combination of these three dimensions. Further, * M * can be submitted to get the aggregate for all males.

Some organizations use software that does not provide MBeans for all components, and instead provides only API's. In an exemplary embodiment in accordance with the aspects of the present invention, a mechanism for adapting API to MBeans is provided. In this embodiment, a platform support can be added to map appropriate programmer APIs to MBeans.

In the foregoing description of the exemplary embodiment, use of a single hooking mechanism through an EJB has been illustrated. It should be noted, however, the hooking mechanism can be used on any major component type, such as web services, servlets, web applications, and the like. For example, a servlet may be provided at the backend, and made to look like a component. Even though the backend is not an EJB, a hook may be placed on the servlet without modifying the servlet code.

Figure 7:
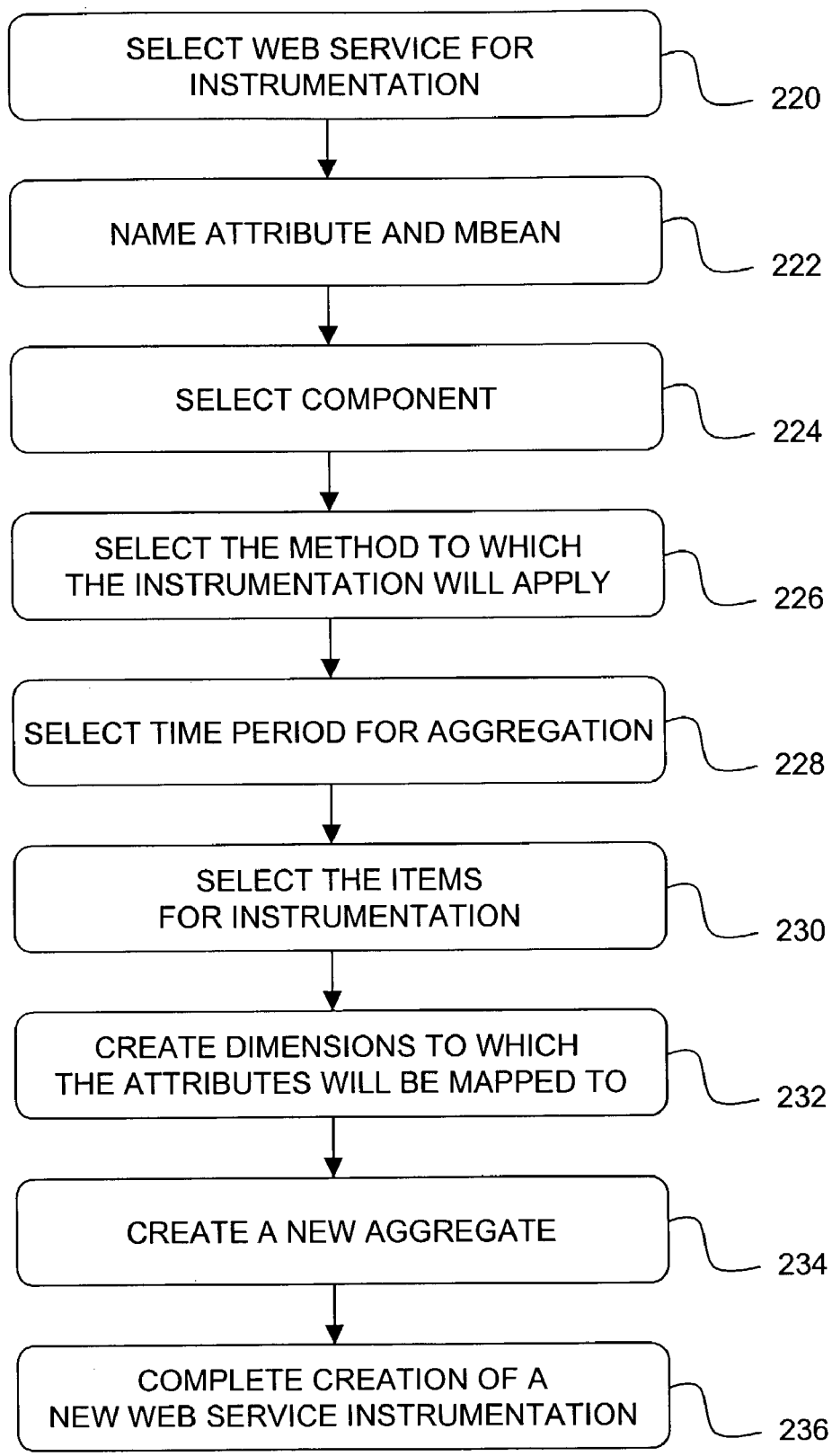
FIG. 7 is a flow diagram that illustrates a web service instrumentation in an exemplary embodiment in accordance with aspects of the present invention.

FIG. 7 is a flow diagram that illustrates web service instrumentation in an exemplary embodiment in accordance with aspects of the present invention. FIG. 7 may be described in reference to screen shots 250 through 330 on FIGS. 8-16. The sequence, name, appearance, and the like for various different windows (or panels) in the screen shots may be different in other embodiments.

Figure 8:
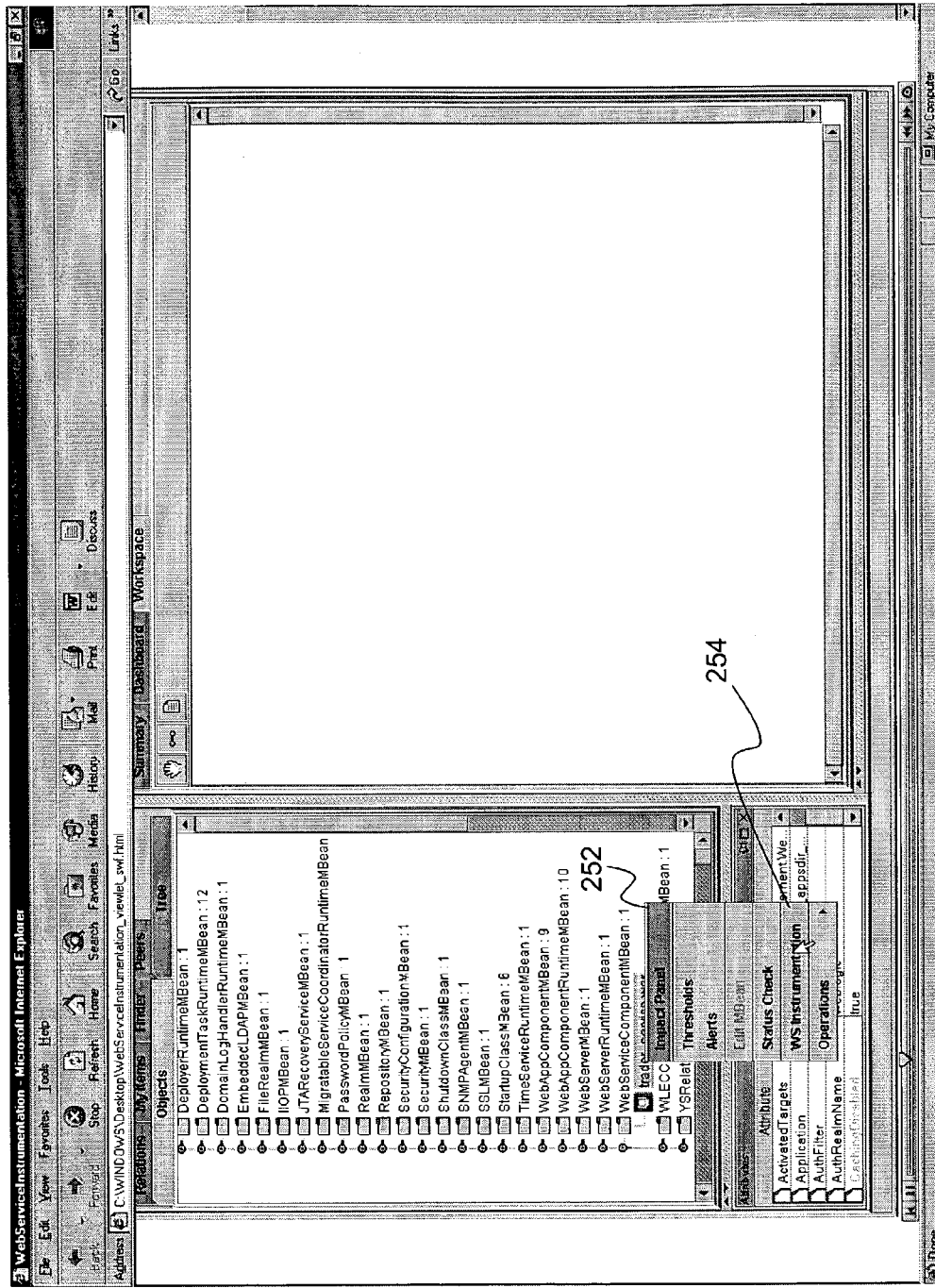
FIG. 8 is a screen shot that illustrates web service selection for instrumentation.

In block 220, a new web service for instrumentation is selected as illustrated in screen shot 250 of FIG. 8. A context menu 252 for selecting a WS ("web service") Instrumentation option may be selected, for example, by right clicking a mouse. The selected web service, for example, may be a trader service, as indicated by its name of trade_service.war where .war extension indicates that it is a web archive.

Figure 9:
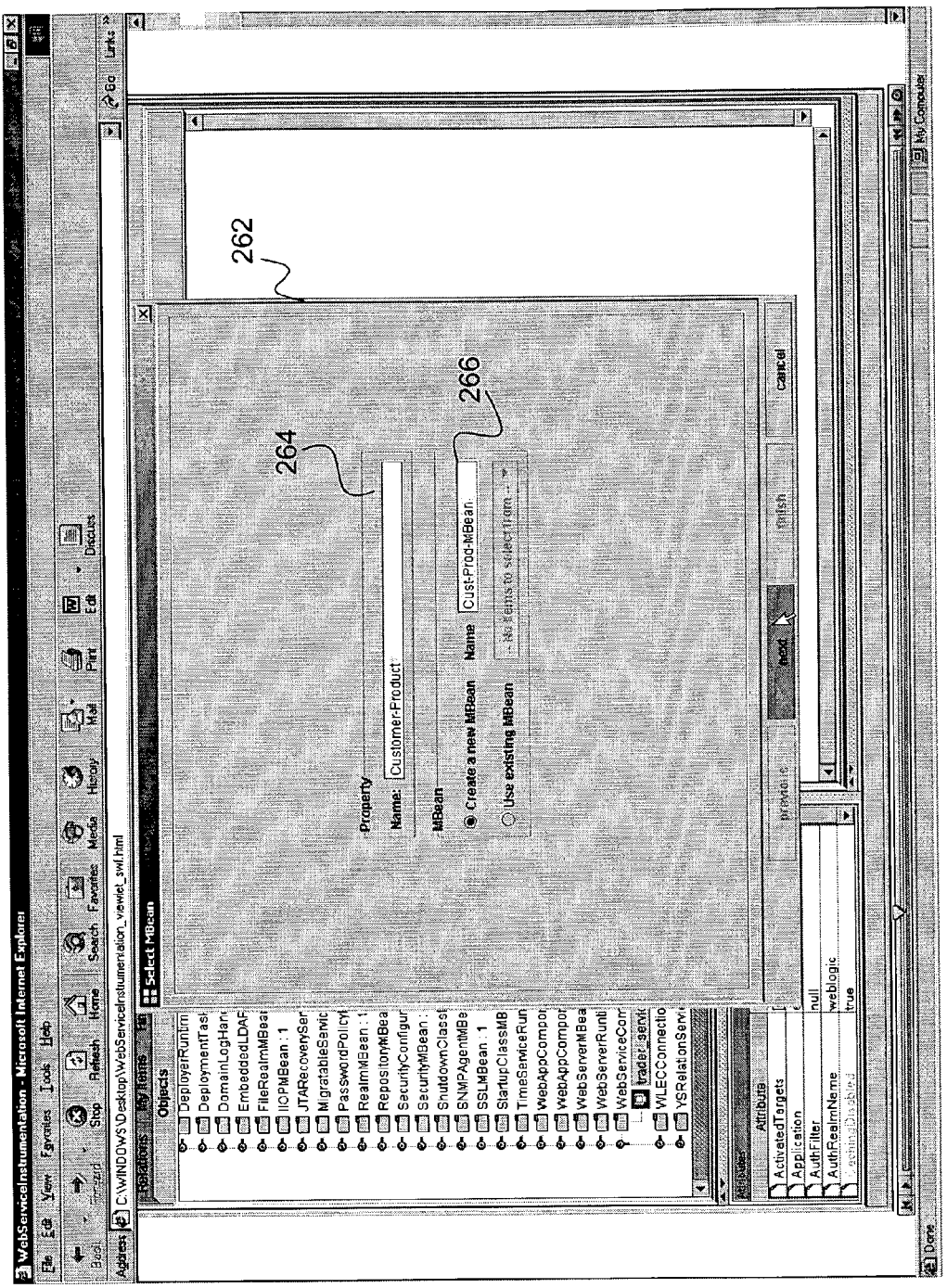
FIG. 9 is a screen shot that illustrates naming of attributes and MBean.

Names for the attribute and MBean are entered in block 222 as illustrated in screen shot 260 of FIG. 9. The screen shot 260 has displayed thereon a "Select MBean" window 262. The "Select MBean" window has an attribute name field 264 and an MBean name field 266. For example, the screen shot 262 illustrates that the attribute name is "Customer-Product" and the MBean name is "Cust-Prod-Mbean" in this exemplary embodiment.

Figure 10:
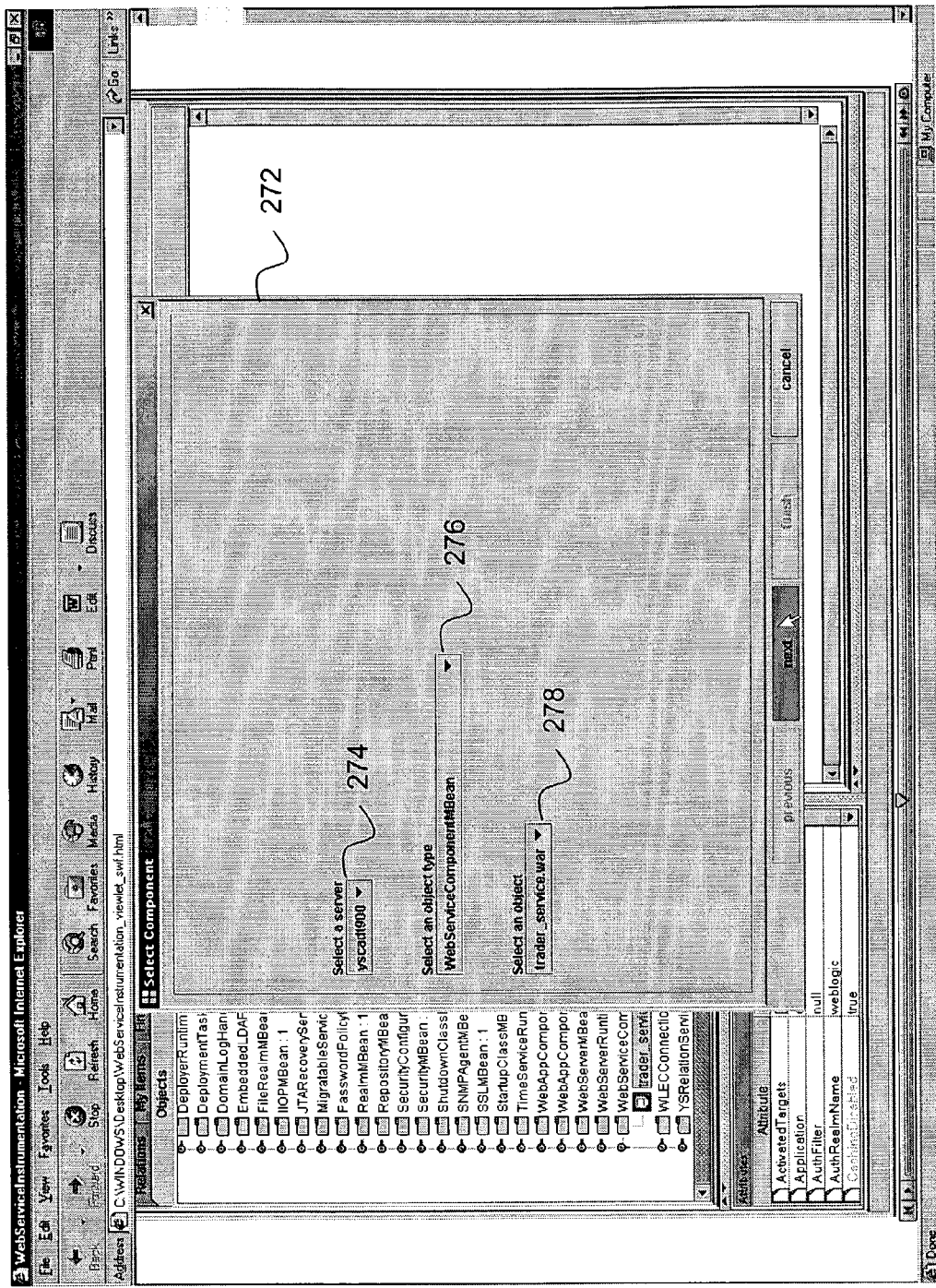
FIG. 10 is a screen shot that illustrates component selection.

In block 224, as illustrated in screen shot 270 of FIG. 10, a "Select Component" window is provided for selecting a component or service. This window provides an option to select another service or component, other than the one selected in block 220. The options are for selecting a server (274), selecting an object type (276) and selecting an object (278). For the purposes of the present discussion, the instrumentation process can proceed to the next window in the wizard since the web service to be instrumented has already been selected. Please note that another web service to be instrumented may have been selected at this point.

Figure 11:
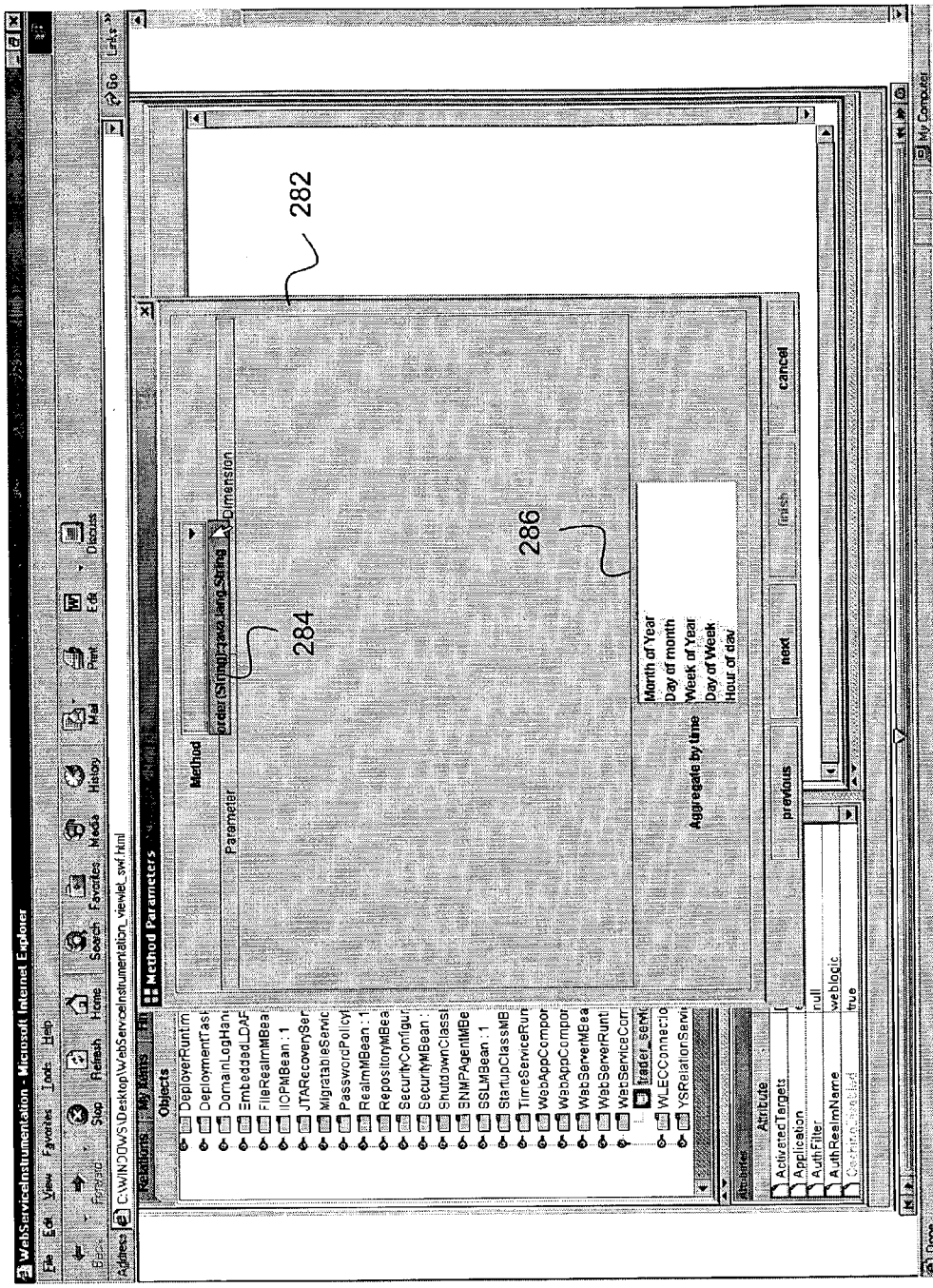
FIG. 11 is a screen shot that illustrates selection of the method to which the instrumentation will apply.
Figure 12:
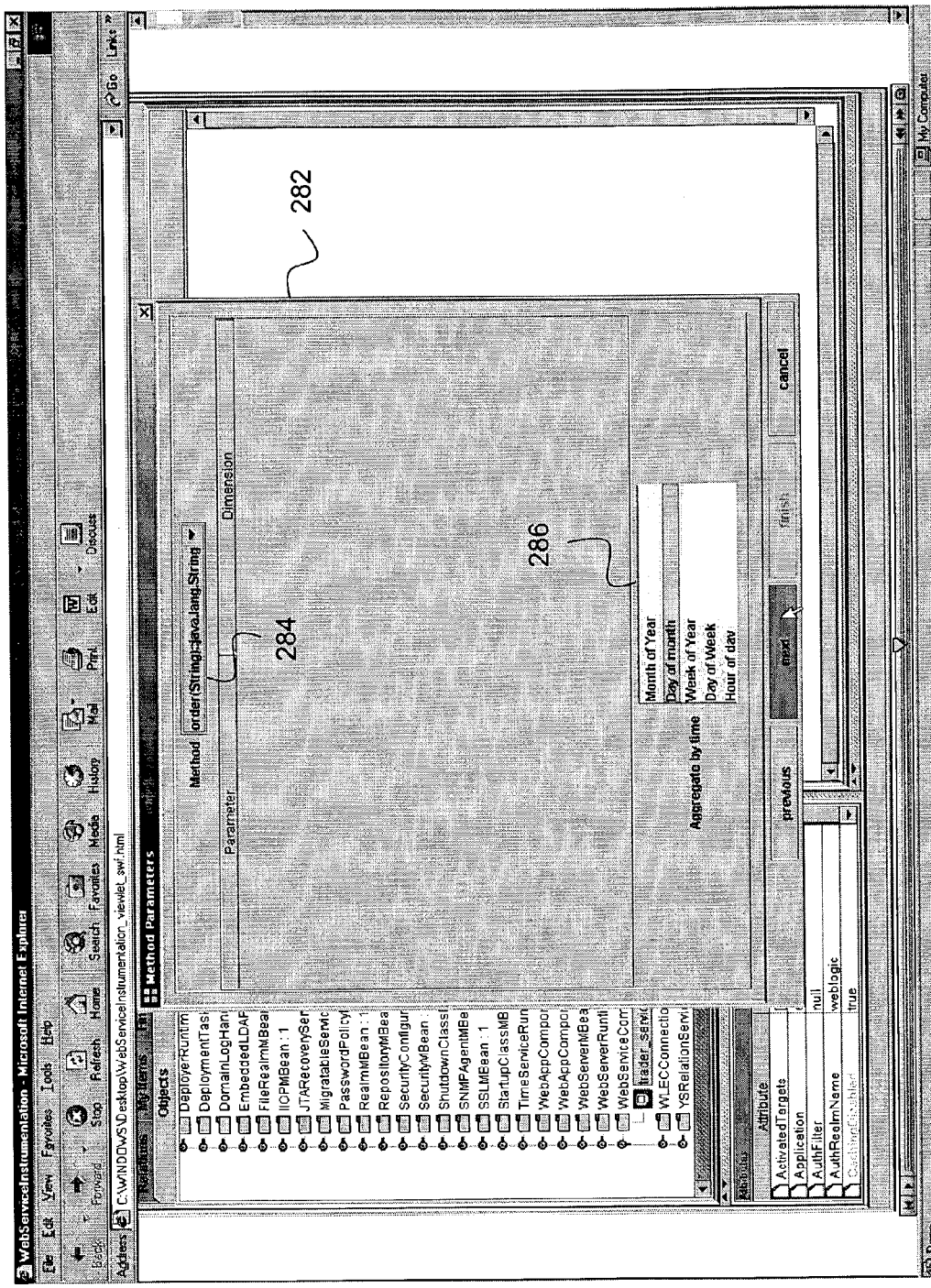
FIG. 12 is a screen shot that illustrates selection of a time period for aggregation.

A method to which the instrument will apply is selected in block 226 as illustrated in screen shot 280 of FIG. 11. The screen shot 280 includes a "Method Parameters" window 282. For example, "order(string):: java.lang.String" has been selected as a method 284 in the "Method Parameters" window 282. The "Method Parameters" window 282 also includes a field 286 that can be used to select the time period for aggregation. In FIG. 12, "Day of Month" is selected as the time period for aggregation in screen shot 290 as shown in block 228 of FIG. 7.

Figure 13:
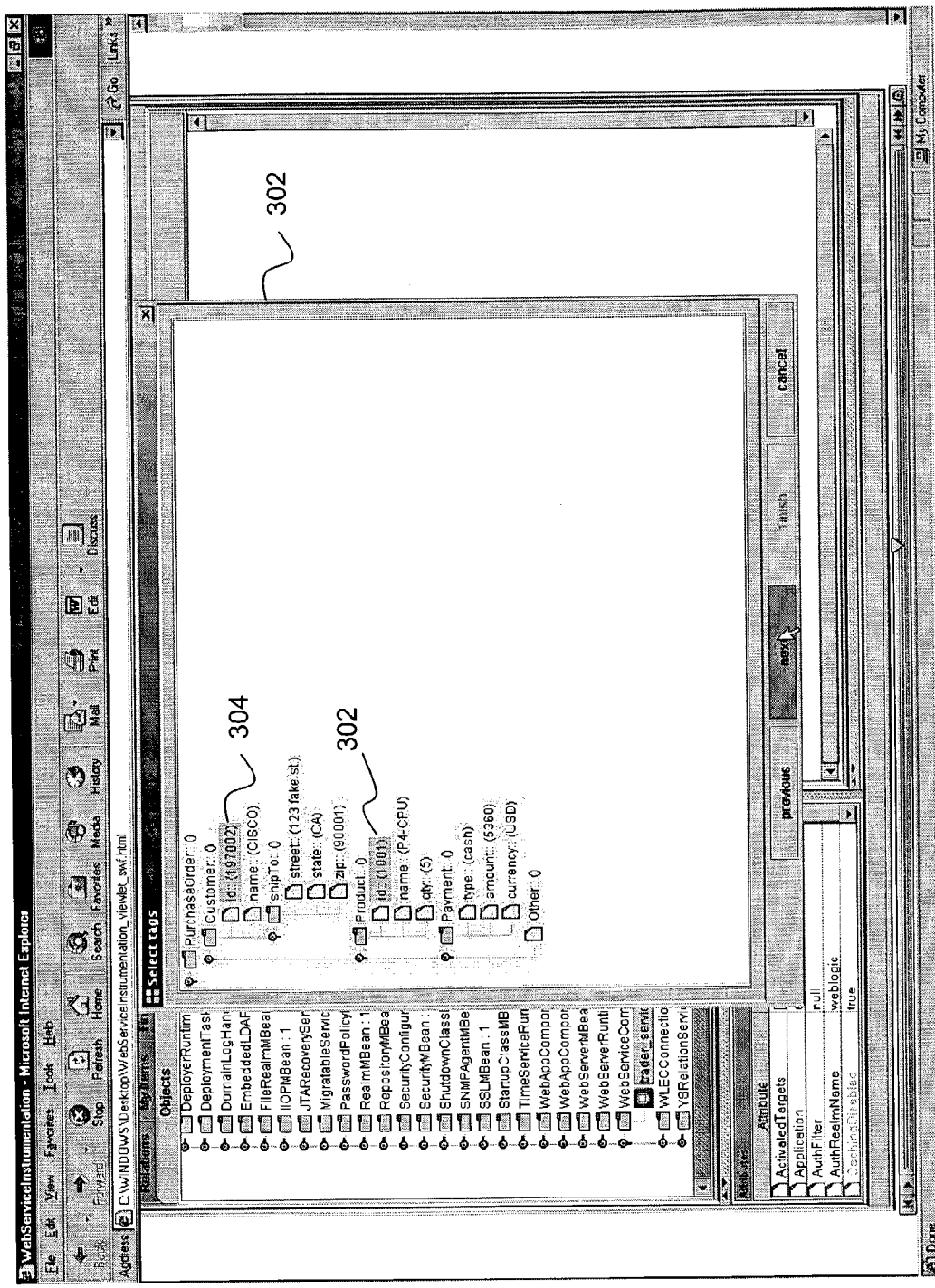
FIG. 13 is a screen shot that illustrates selection of items for instrumentation.

In block 230, items for instrumentation are selected as illustrated on screen shot 300 of FIG. 13. The screen shot 300 illustrates a "Select tags" window 302. In the "Select tags" window 302, a customer id 304 and a product id 306 have been selected for aggregation, for example. In other embodiments, of course, other items may be selected for instrumentation.

Figure 14:
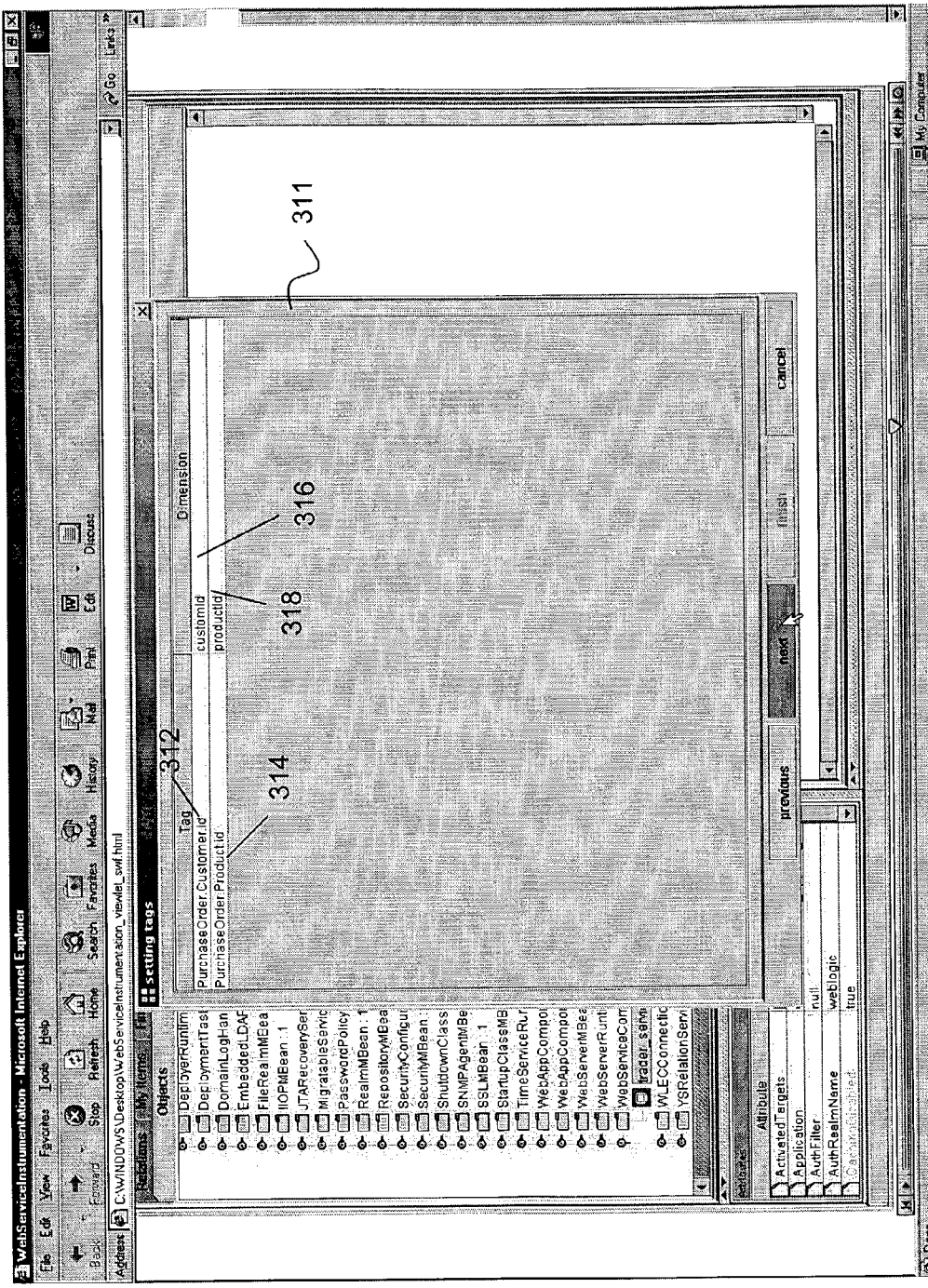
Figure 15:
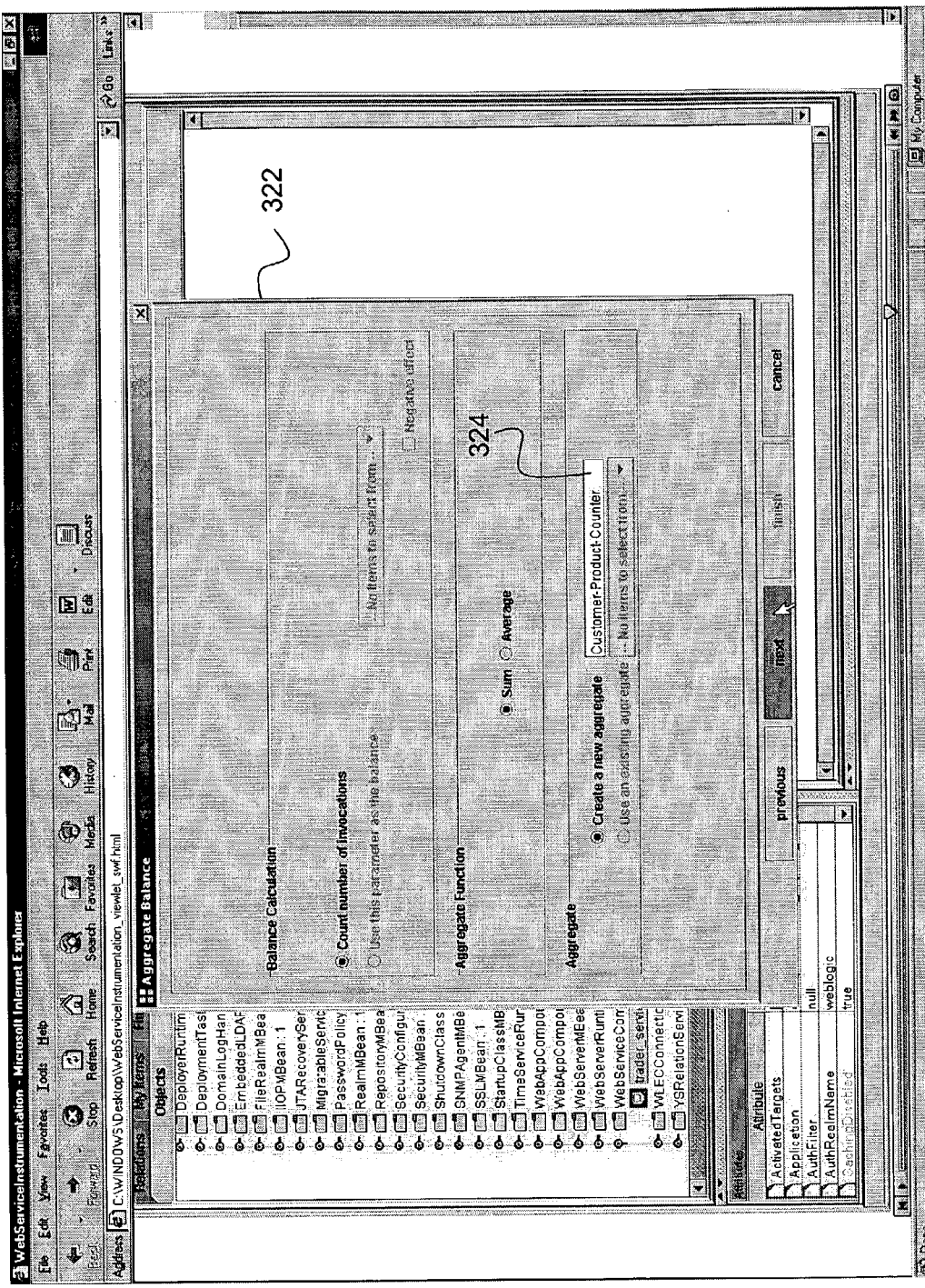
FIG. 15 is a screen shot that illustrates creation of a new aggregate.

In block 232, the dimensions to which the attributes will be mapped to are created as illustrated in a "Setting tags" window 311 of screen shot 310 of FIG. 14. For example, "PurchaseOrder.Customer.id" tag 312 is mapped to a "customid" dimension 316, and "PurchaseOrder.Product.id" tag 314 is mapped to a "productid" dimension 318. A new aggregate is created in block 234 as illustrated, for example, in screen shot 320 of FIG. 15. In the screen shot 320, an "Aggregate Balance" window 322 has a new aggregate field 324 for entering the new aggregate to be created. The screen shot 320 illustrates "Customer-Product-Counter" as the name for the new aggregate. As shown in the screen shot 320, the aggregate functions includes "Sum" and "Average." In other embodiments, the aggregate functions may include other mathematical and/or logical operations.

Figure 16:
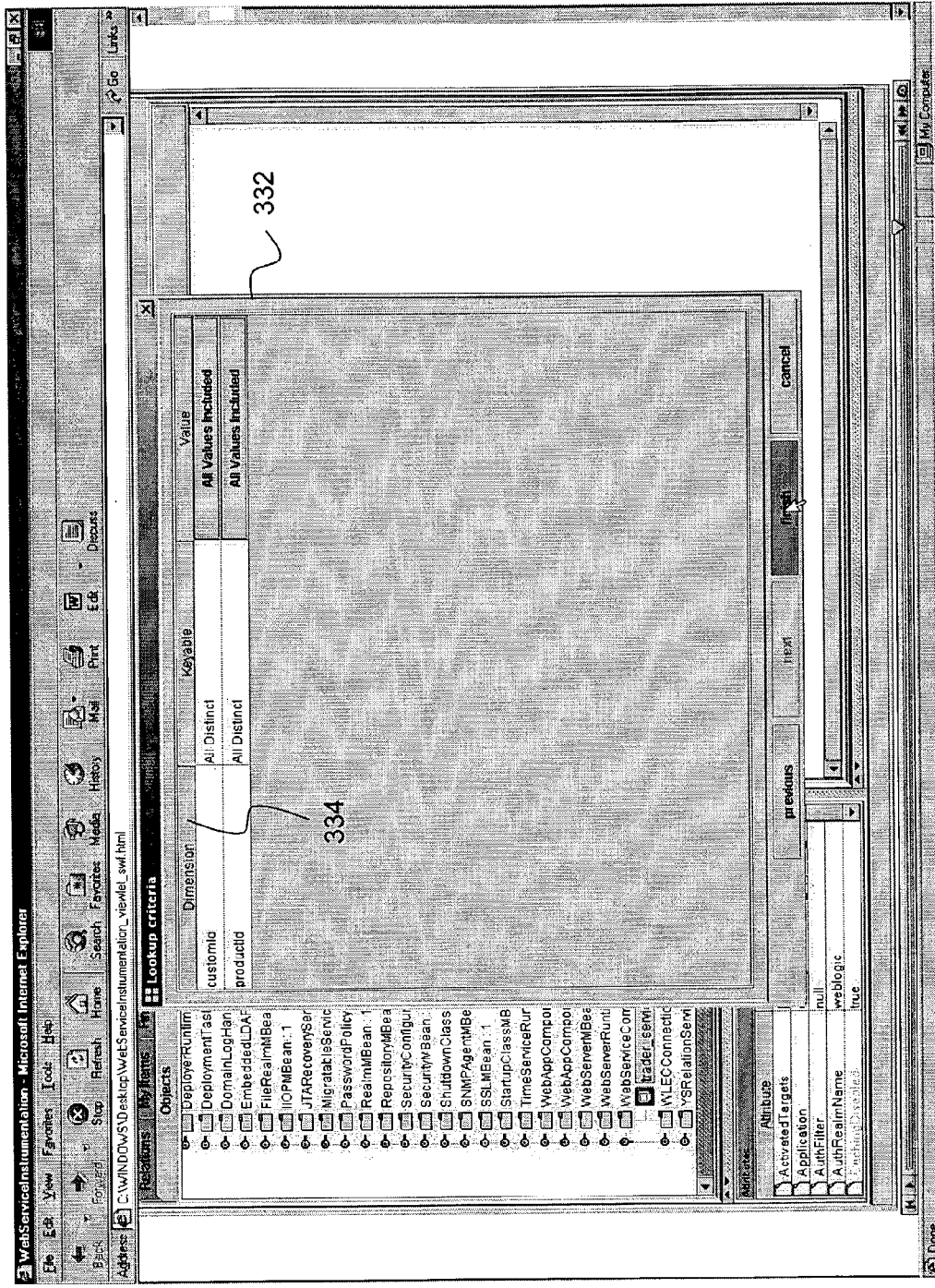
FIG. 16 is a screen shot that illustrates completion of creation of a new web service instrumentation.

In block 236, the creation of a new web service instrumentation is completed by clicking a "Finish" button as illustrated in screen shot 330 of FIG. 16. The screen shot 330 includes a "Lookup Criteria" window 332 that can be used to select the look up criteria for the selected dimensions 334. Default criteria may be selected and/or specific criteria may be entered in the "Lookup Criteria" window 332.

It will be appreciated by those of ordinary skill in the art that the invention can be embodied in other specific forms without departing from the spirit or essential character thereof. The present invention is therefore considered in all respects to be illustrative and not restrictive. The scope of the invention is indicated by the appended claims, and all changes that come within the meaning and range of equivalents thereof are intended to be embraced therein.

The invention claimed is:

1. A method for business activity monitoring comprising:

creating a management object;

attaching the management object to an operational component without modifying software for the operational component, wherein the operational component is configured to provide a business-related service via a software function included in the operational component, the software function having a defined parameter;

monitoring and aggregating data associated with the operational component, wherein the monitoring and aggregating includes:

monitoring each of a plurality of calls to the software function, wherein each of the plurality of calls passes a value to the software function for the defined parameter; and aggregating each value passed to the software function into a single data field of the management object;
performing real-time analysis of the values aggregated into the single data field of the management object; and
providing real-time visibility to the values aggregated into the single data field of the management object.

2. The method of claim 1, wherein the operational component is selected from a group consisting of a web service, a servlet and a web application.

3. The method of claim 1, further comprising defining a threshold for the monitored data; and generating an alert upon reaching the threshold.

4. The method of claim 1, wherein creating comprises specifying dimensions for aggregating the data.

5. The method of claim 1, wherein attaching comprises hooking.

6. The method of claim 5, wherein hooking comprises Enterprise Java Beans (EJB™) hooking.

7. The method of claim 1, wherein the management object is created using a management bean.

8. A system for business activity monitoring instrumentation, the system comprising:
a client providing a graphical user interface accessible to a user for accessing an operational component configured to provide a business-related service via a software function included in the operational component, the software function having a defined parameter, the graphical user interface further receiving user commands for generating a management object for the operational component; and
one or more servers coupled to the client, the one or more servers configured to generate the management object in response to the user commands without modifying software for the operational component, the one or more servers being further configured to monitor and aggregate data associated with the operational component, perform real-time analysis of the aggregated data via the management object, and provide real-time visibility to the aggregated data via the management object, wherein the monitoring and the aggregating includes:
monitoring each of a plurality of calls to the software function, wherein each of the plurality of calls passes a value to the software function for the defined parameter; and
aggregating each value passed to the software function into a single data field of the management object.

9. The system of claim 8, wherein the graphical user interface comprises a navigation panel configured to display and navigate a tree structure of a plurality of management objects that are organized into folders and sub-folders.

10. The system of claim 9, wherein the client is configured to receive user selection of one of the management objects via the navigation panel, and the graphical user interface further comprises an attributes panel configured to display attributes of the selected management object.

11. The system of claim 8, wherein the graphical user interface comprises an events panel configured to display at least one of alerts, failures and thresholds associated with the operational component being monitored.

12. The system of claim 8, wherein the graphical user interface comprises a view panel configured to display a graphical representation of the aggregated data associated with the operational component being monitored.

13. The system of claim 12, wherein the view panel comprises a dashboard configured to display relationships between the management objects.

14. The system of claim 13, wherein the graphical user interface is configured to map the management object to the operational component to instrument business activity monitoring.

15. The system of claim 8, wherein the one or more servers includes at least one broker server, at least one adapter, and at least one database, wherein said at least one broker accesses the aggregated data stored in said at least one database via said at least one adapter.

16. The system of claim 8, wherein the one or more servers includes a registry server configured to listen to events associated with the aggregated data.

17. The system of claim 16, wherein the registry server is configured to provide information regarding the aggregated data to the client via messages corresponding to the events.

18. The system of claim 17, wherein the events are user defined.

19. The system of claim 18, wherein the client is configured to log events corresponding to the messages received from the registry server.

20. The system of claim 19, wherein the client is configured to perform a root cause analysis if at least one of the events is a failure of an object.

21. The system of claim 20, wherein the client is configured to take note of other objects affected by the failure.

22. The system of claim 8, wherein the graphical user interface is accessible by a user to specify dimensions used to access the aggregated data.

23. The method of claim 5, wherein the hooking includes making a connection with specific ones of the one or more software procedures included in the operational component, wherein the connection is established at a byte code level of the operational component.

24. A computer-implemented method for business activity monitoring comprising:
accessing by a client device a computer-implemented business operation component including a software function having a defined parameter, the business operation component configured to provide a business-related service;
generating by a server coupled to the client device, a management object via a graphical user interface for monitoring the business activity associated with the business operation component, wherein the generating includes:
identifying the business operation component via the graphical user interface;
identifying the software function included in the business operation component, via the graphical user interface;
identifying a data field of the management object via the graphical user interface; and
mapping the parameter defined for the software function, to the data field of the management object;
monitoring each of a plurality of calls to the software function, wherein each of the plurality of calls passes a value to the software function for the defined parameter;
aggregating, based on the monitoring, each value passed to the software function into the mapped data field of the management object; and
accessing the data field of the management object and displaying, in real-time, the values aggregated into the mapped data fields.

25. The computer-implemented method of claim 24, wherein the mapping of the parameter to the data field of the management object includes:
displaying, via the graphical user interface, the parameter defined for the software function;

receiving, via the graphical user interface, a user selection of the displayed parameter;

displaying, via the graphical user interface, the data field of the management object;

receiving, via the graphical user interface, a user selection of the displayed data field; and receiving, via the graphical user interface, a user command to map the selected parameter to the selected data field.

26. The computer-implemented method of claim 24, wherein the management object is a software object.

* * * * *